Oct. 18, 1949.  A. MOTTU  2,484,956
PROJECTION APPARATUS HAVING OPAQUE SHUTTER
AND SCREEN ILLUMINATION MEANS
Filed Dec. 17, 1947
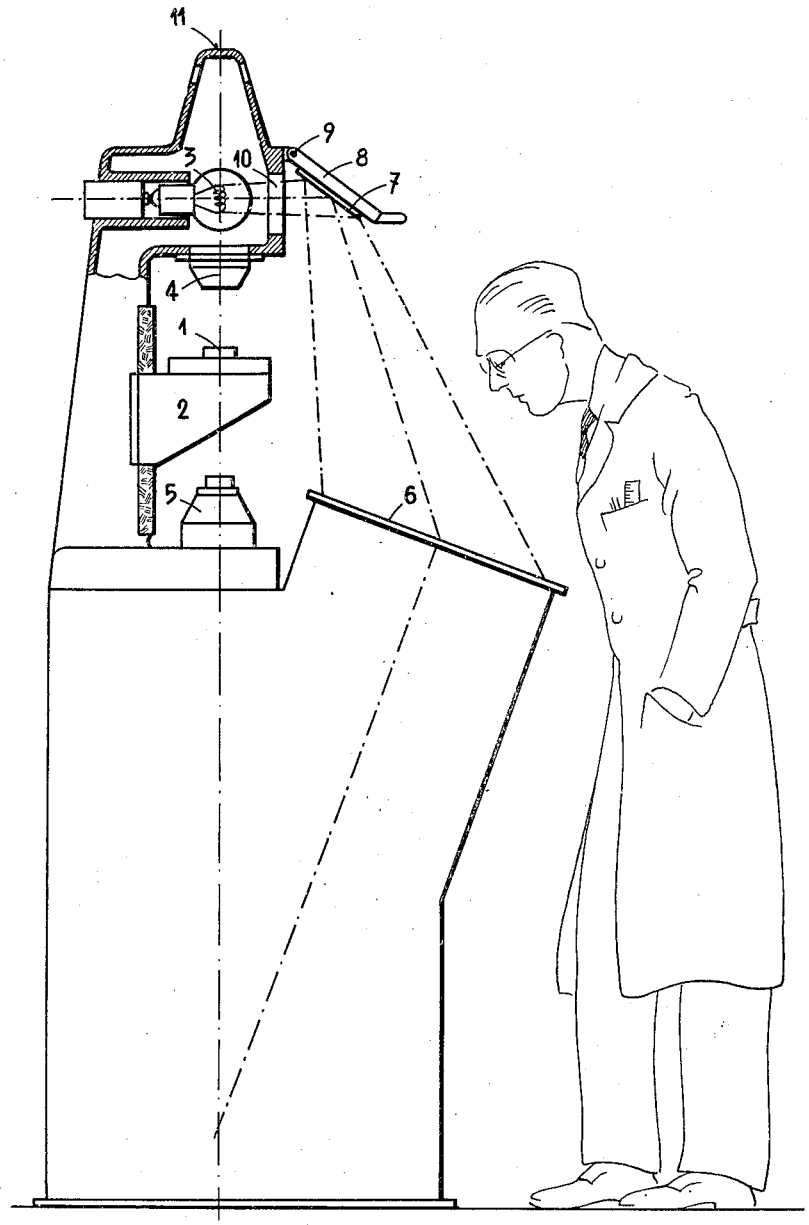
Inventor
Andre Mottu.
BY
Attorney Patented Oct. 18, 1949

2,484,956

UNITED STATES PATENT OFFICE 2,484,956

PROJECTION APPARATUS HAVING OPAQUE SHUTTER AND SCREEN ILLUMINATION MEANS

André Mottu, Geneva, Switzerland, assignor to Societe Genevoise d'Instruments de Physique, a corporation of Switzerland Application December 17, 1947, Serial No. 792,271
In Switzerland April 13, 1945

Section 1, Public Law 690, August 8, 1946
Patent expires April 13, 1965

2 Claims. (Cl. 88—24)

This invention relates to projection apparatus for industrial purposes and of the kind adapted to project on the underside of a translucent screen a greatly magnified image of mechanical parts for the purpose of examination.

Such projection apparatus cannot have a sufficiently powerful light source for the magnified image on the screen to be visible in daylight. It is therefore necessary to install these projection apparatuses in more or less dark positions to enable them to be used effectively. Under these conditions, an operator can see the image projected on the screen clearly, but cannot distinguish plainly the various accessories he has to apply on the screen for examination of the projected image, particularly if such accessories are opaque. On the other hand, the use of ordinary illuminating means for momentarily illuminating the place where the projection apparatus is located so as to be able to see the accessories properly, is unsatisfactory because the eyes of the operator have to become accustomed alternately to normal illumination, which is always fairly intense, and to obscurity, which is a source of strain on the eyes.

The present invention has for its object the provision of auxiliary means for illuminating the upper surface of the translucent screen, whereby the disadvantages referred to may be obviated.

According to the present invention, projection apparatus of the kind referred to is provided with auxiliary illuminating means comprising an opaque shutter having a reflective face on its inner or underside, which shutter, when in an open position, diffuses on the upper surface of the translucent screen a soft light emanating from the light source of the projection apparatus, while, when the shutter is in a closed position, the illumination of the upper surface of the translucent screen is shut off. The auxiliary illuminating means according to the invention, not only obviates the disadvantages referred to, but eliminates the cost of a separate lighting installation at the place where the projection apparatus is located.

The invention is hereinafter described, by way of example, with reference to the accompanying diagrammatic drawing, which illustrates one embodiment of the auxiliary illuminating means according to the invention shown as applied to projection apparatus of the kind referred to of conventional form.

An object 1 to be examined is placed on an adjustable table 2 and, when it is desired to examine its profile, is illuminated by a luminous source 3, the light from which is projected in the form of a beam by a condenser 4.

An objective 5 projects an image of the object 1 suitably magnified on the underside of a translucent screen 6.

According to the invention, means are provided for illuminating also the upper surface of the screen 6 when required from the same luminous source 3. For this purpose an opaque shutter 8 is pivoted on a horizontal shaft 9 so as to depend therefrom, and is provided at its inner or underside with a reflective surface or element 7 whereby light from the source 3 may be diverted to illuminate the translucent screen 6 when the shutter 8 is in an open position as shown in the drawing.

The auxiliary illumination so provided is of a soft character in order to prevent any appreciable fading of the projected image, but nevertheless, in certain cases, it may be undesirable. The operator does not require the auxiliary illumination of the screen continuously and by moving the shutter 8 about its pivot to a vertical position, the shutter may be caused to obturate the aperture 10 which is provided in the housing 11 and thus to cut off the auxiliary illumination of the translucent screen 6.

The arrangement hereinbefore described presents an important advantage in that, when the shutter 8 is in the open position, which may be fixed with the aid of any suitable locking means not shown, the path of the luminous rays from the reflective surface 7 to the translucent screen 6, as shown in the drawing, is not intercepted by the operator.

I claim:

1. In projection apparatus, the combination comprising, a source of light, a housing carrying said source and having a downwardly directed aperture aligned with said source, an object-supporting table arranged below the housing and aligned with said aperture, an outwardly declining translucent screen disposed at the front of said apparatus, means including a condenser and projecting a magnified image of the object on said table onto the underside of the translucent screen, a second laterally directed aperture in the housing and aligned with the source, and an opaque shutter having a reflective under surface mounted on the housing and movable from a position obturating the second aperture to an open position reflecting a portion of the light onto the upper surface of said screen whereby obstruction of the light from said reflective surface by the operator is prevented.

2. A projection apparatus according to claim 1 wherein the opaque shutter is hinged on the housing.

ANDRÉ MOTTU.

REFERENCES CITED

The following references are of record in the file of this patent:

UNITED STATES PATENTS

| Number | Name | Date |
|---|---|---|
| 1,703,933 | Hartness et al. | Mar. 5, 1929 |
| 2,192,529 | Thomas et al. | Mar. 5, 1940 |
| 2,214,376 | Kurtz | Sept. 10, 1940 |
| 2,313,639 | Hauser | Mar. 9, 1943 |
| 2,391,999 | Portman et al. | Jan. 1, 1946 |

FOREIGN PATENTS

| Number | Country | Date |
|---|---|---|
| 587,407 | Germany | Nov. 3, 1933 |
| 218,409 | Switzerland | Apr. 1, 1942 |